United States Patent
Ikoma et al.

(10) Patent No.: US 11,911,747 B2
(45) Date of Patent: Feb. 27, 2024

(54) CATALYST FOR AMMONIA DECOMPOSITION AND EXHAUST GAS TREATMENT METHOD

(71) Applicant: NIKKI-UNIVERSAL CO., LTD., Tokyo (JP)

(72) Inventors: Tomoo Ikoma, Kanagawa (JP); Toshiya Nashida, Kanagawa (JP)

(73) Assignee: NIKKI-UNIVERSAL CO., LTD., Tokyo (JP)

( * ) Notice: Subject to any disclaimer, the term of this patent is extended or adjusted under 35 U.S.C. 154(b) by 351 days.

(21) Appl. No.: 17/312,519

(22) PCT Filed: Dec. 26, 2019

(86) PCT No.: PCT/JP2019/051219
§ 371 (c)(1),
(2) Date: Jun. 10, 2021

(87) PCT Pub. No.: WO2020/138327
PCT Pub. Date: Jul. 2, 2020

(65) Prior Publication Data
US 2022/0055023 A1    Feb. 24, 2022

(30) Foreign Application Priority Data

Dec. 27, 2018 (JP) ................. 2018-243993

(51) Int. Cl.
*B01J 29/06* (2006.01)
*B01D 53/86* (2006.01)
*B01J 23/10* (2006.01)
*B01J 23/42* (2006.01)
*B01J 23/44* (2006.01)
*B01J 29/068* (2006.01)
*B01J 29/072* (2006.01)
*B01J 29/72* (2006.01)
*B01J 29/76* (2006.01)
*B01J 35/00* (2006.01)
*B01J 37/03* (2006.01)
*B01J 37/30* (2006.01)
*B01J 35/04* (2006.01)
*B01J 37/02* (2006.01)
*B01J 37/04* (2006.01)

(52) U.S. Cl.
CPC ...... *B01J 29/7215* (2013.01); *B01D 53/8634* (2013.01); *B01J 23/10* (2013.01); *B01J 23/42* (2013.01); *B01J 23/44* (2013.01); *B01J 29/06* (2013.01); *B01J 29/061* (2013.01); *B01J 29/068* (2013.01); *B01J 29/072* (2013.01); *B01J 29/72* (2013.01); *B01J 29/76* (2013.01); *B01J 29/7615* (2013.01); *B01J 35/0006* (2013.01); *B01J 35/0033* (2013.01); *B01J 37/038* (2013.01); *B01J 37/30* (2013.01); *B01J 35/04* (2013.01); *B01J 37/0215* (2013.01); *B01J 37/04* (2013.01); *B01J 2229/186* (2013.01); *B01J 2229/20* (2013.01); *B01J 2229/42* (2013.01)

(58) Field of Classification Search
CPC ............... Y02A 50/20; B01D 53/8634; B01D 2255/50; B01D 2255/1021; B01D 2255/1023; B01J 23/42; B01J 23/44; B01J 37/04; B01J 37/038; B01J 37/0215; B01J 37/088; B01J 37/30; B01J 35/0033; B01J 35/0006; B01J 35/1014; B01J 35/1019; B01J 35/023; B01J 2229/20; B01J 2229/42; B01J 2229/186; B01J 29/06; B01J 29/068; B01J 29/061; B01J 29/072; B01J 29/72; B01J 29/7215; B01J 29/7615; B01J 29/76
USPC ............................ 502/60, 63, 64, 66, 69, 74
See application file for complete search history.

(56) References Cited

U.S. PATENT DOCUMENTS

| 5,278,113 | A | * | 1/1994 | Ono | ............... | B01J 29/068 |
|---|---|---|---|---|---|---|
| | | | | | | 502/66 |
| 5,292,991 | A | * | 3/1994 | Lachman | ............. | B01J 37/0246 |
| | | | | | | 423/247 |
| 5,587,134 | A | | 12/1996 | Dannevang | | |
| 6,127,300 | A | * | 10/2000 | Kharas | ............. | B01D 53/945 |
| | | | | | | 502/67 |
| 11,202,991 | B2 | * | 12/2021 | Miyasaka | ............ | B01D 53/945 |
| 2006/0213187 | A1 | * | 9/2006 | Kupe | ............. | F01N 3/035 |
| | | | | | | 60/286 |
| 2007/0274889 | A1 | | 11/2007 | Nakatsuji et al. | | |

(Continued)

FOREIGN PATENT DOCUMENTS

| GB | 2 364 301 A | 1/2002 |
|---|---|---|
| JP | 7-227521 A | 8/1995 |

(Continued)

OTHER PUBLICATIONS

Extended European Search Report for European Application No. 19904697.0, dated Sep. 2, 2022.

(Continued)

*Primary Examiner* — Elizabeth D Wood
(74) *Attorney, Agent, or Firm* — Birch, Stewart, Kolasch & Birch, LLP

(57) ABSTRACT

Provided is an ammonia decomposition catalyst that exhibits high durability while maintaining high ammonia decomposition activity and low emissions of nitrogen oxides, for example, even under an atmosphere with a steam concentration of about 10% by volume. An ammonia decomposition catalyst capable of decomposing ammonia contained in an exhaust gas, the catalyst comprising an inorganic oxide loaded with an alloy containing Pt and Pd, and a zeolite.

6 Claims, No Drawings

(56) References Cited

U.S. PATENT DOCUMENTS

2012/0328499 A1 12/2012 Ando et al.
2015/0037233 A1 2/2015 Fedeyko et al.
2015/0165422 A1 6/2015 Sung et al.

FOREIGN PATENT DOCUMENTS

| JP | 7-246317 A | 9/1995 |
| JP | 7-289897 A | 11/1995 |
| JP | 8-131832 A | 5/1996 |
| JP | 8-173766 A | 7/1996 |
| JP | 9-271637 A | 10/1997 |
| JP | 10-249165 A | 9/1998 |
| JP | 2001-293480 A | 10/2001 |
| JP | 2004-58019 A | 2/2004 |
| JP | 2007-21482 A | 2/2007 |
| JP | 2007-216082 A | 8/2007 |
| JP | 2008-62235 A | 3/2008 |
| JP | 2016-532548 A | 10/2016 |
| WO | WO 2009/075311 A1 | 6/2009 |

OTHER PUBLICATIONS

International Search Report for PCT/JP2019/051219 (PCT/ISA/237) dated Mar. 17, 2020.
Written Opinion of the International Searching Authority for PCT/JP2019/051219 (PCT/ISA/237) dated Mar. 17, 2020.

\* cited by examiner

CATALYST FOR AMMONIA DECOMPOSITION AND EXHAUST GAS TREATMENT METHOD

TECHNICAL FIELD

The present invention relates to an ammonia decomposition catalyst and an exhaust gas treatment method.

BACKGROUND ART

Ammonia-containing exhaust gases are typically generated in the electronic material manufacturing industry, the fertilizer production industry, or factories equipped with denitration facilities. Such exhaust gases need to be treated since they may often have a strong smell and may have an influence on the human body. The exhaust gases generated from the aforementioned emission sources generally contain air as a main component, and also contain ammonia and 1 to 10% by volume of steam. Further, in the ammonia stripping process which is increasingly being adopted in the fields of sewage treatment and the like, a steam gas containing ammonia is emitted. This exhaust gas contains large amounts of ammonia and steam.

It is required that catalysts for use to treat such exhaust gases should have high ammonia decomposition activity even in the presence of steam. Also, it is required that such catalysts should have the capability of preventing the emission of byproducts of nitrogen oxides or the like and converting ammonia to nitrogen and water—i.e., should have high nitrogen selectivity. Further, it is required that such catalysts should be capable of maintaining high ammonia decomposition activity, even during long-term use, without being affected by hydrogen sulfide or the like present in an exhaust gas—i.e., should have durability.

For example, catalysts for decomposition of ammonia or organic nitrogen compounds have been disclosed as follows. PTL 1 discloses that an exhaust gas containing organic nitrogen compounds other than ammonia as emitted from wastewater treatment is oxidized by contacting with a catalyst comprising $VO_2$, $WO_3$ and palladium loaded on titania and/or titania-silica, to thereby convert to $N_2$, $CO_2$ and $H_2O$.

PTL 2 discloses that catalysts for treating exhaust gases containing organic nitrogen compounds such as acrylonitrile, in which one or two or more metals selected from Fe, Cu, Ag and Co are loaded on a support of a zeolite or a metal oxide such as $Al_2O_3$, $SiO_2$, $TiO_2$ or $ZrO_2$, are capable of converting acrylonitrile to $N_2$ with high selectivity.

PTLs 3 and 4 disclose that precious metal-free catalysts, in which Mn is loaded on, or mixed with, a zeolite with a $SiO_2/Al_2O_3$ ratio of not less than 10, are capable of converting ammonia to $N_2$ while preventing NO or $NO_2$ emission even in the presence of excess oxygen.

PTL 5 discloses that ammonia decomposition catalysts, in which any of V, W and Mo, and a precious metal are loaded on a composite oxide such as $TiO_2$—$SiO_2$ or $TiO_2$—$SiO_2$—$ZrO_2$, have high ammonia decomposition activity and are less susceptible to loss of activity caused by sulfur compounds. However, this literature merely demonstrates that the aforementioned catalysts showed high initial activity for exhaust gases with a water content of 2%, $NH_3$ concentrations of from 50 to 400 ppm, and a $H_2S$ concentration of 30 ppm. The literature is not specifically descriptive of the durability of these catalysts.

PTL 6 discloses ammonia decomposition catalysts in which any of V and W, and Pt or Ir are loaded on $TiO_2$. This literature also discloses that after an exhaust gas with a steam concentration of 10%, a $NH_3$ concentration of 10 ppm, and a $SO_2$ concentration of 100 ppm was treated for 3,000 hours using said catalysts, the catalysts maintained ammonia decomposition efficiency of from 88 to 93%.

PTL 7 discloses ammonia removal catalysts in which platinum, rhodium, iridium, palladium or ruthenium is loaded on a zeolite, γ-alumina, titania, or the like. These catalysts are capable of removing ammonia under the coexistence of oxygen and hydrogen at ordinary temperatures to 200° C.

PTL 8 discloses ammonia decomposition catalysts prepared by sulfating a catalyst in which a metal selected from copper, cobalt, iron, chromium, nickel or manganese, or an oxide of said metal, and a further metal selected from platinum or palladium, are loaded on a support composed of alumina, titania or silica. This literature shows that the ammonia decomposition activity and $N_2$ selectivity of catalysts can be improved by sulfation. However, this literature merely demonstrates that said sulfated catalysts showed high initial activity for an exhaust gas with a water concentration of 2%, and is not specifically descriptive of the durability of said catalysts.

CITATION LIST

Patent Literatures

PTL 1: Japanese Unexamined Patent Application Publication No. JP 2001-293480
PTL 2: Japanese Unexamined Patent Application Publication No. JP 2004-58019
PTL 3: Japanese Unexamined Patent Application Publication No. JP 2007-21482
PTL 4: Japanese Unexamined Patent Application Publication No. JP 2007-216082
PTL 5: Japanese Unexamined Patent Application Publication No. JP H07-289897
PTL 6: Japanese Unexamined Patent Application Publication No. JP H08-131832
PTL 7: Japanese Unexamined Patent Application Publication No. JP H10-249165
PTL 8: Japanese Unexamined Patent Application Publication No. JP H08-173766

SUMMARY OF INVENTION

Technical Problem

However, the techniques disclosed in PTLs 1 to 8 are inadequate in terms of ammonia decomposition activity, the capability of preventing the emission of byproducts of nitrogen oxides or the like, and durability, for example, under an atmosphere with a steam concentration of about 10% by volume; thus, further improvements are much needed.

An object of the present invention is to provide an ammonia decomposition catalyst that exhibits high durability while maintaining high ammonia decomposition activity and low emissions of nitrogen oxides, for example, even under an atmosphere with a steam concentration of about 10% by volume, as well as an exhaust gas treatment method using said catalyst.

Solution to Problem

According to the present invention, there is provided an ammonia decomposition catalyst capable of decomposing ammonia contained in an exhaust gas, the catalyst comprising an inorganic oxide loaded with an alloy containing Pt and Pd, and a zeolite.

According to the present invention, there is provided an exhaust gas treatment method comprising the step of bringing the ammonia decomposition catalyst of this invention into contact with an ammonia-containing exhaust gas to effect ammonia decomposition.

Advantageous Effects of Invention

According to the present invention, there can be provided an ammonia decomposition catalyst that exhibits high durability while maintaining high ammonia decomposition activity and low emissions of nitrogen oxides, for example, even under an atmosphere with a steam concentration of about 10% by volume, as well as an exhaust gas treatment method using said catalyst.

DESCRIPTION OF EMBODIMENTS

[Ammonia Decomposition Catalyst]

The ammonia decomposition catalyst of the present invention is a catalyst capable of decomposing ammonia contained in an exhaust gas. The ammonia decomposition catalyst of this invention comprises an inorganic oxide loaded with an alloy containing Pt and Pd, and a zeolite.

The ammonia decomposition catalyst of the present invention comprises an alloy formed with Pt and Pd, and thus, can exhibit improved durability while maintaining high ammonia decomposition activity and low emissions of nitrogen oxides such as $NO_x$ and $N_2O$, for example, even under an atmosphere with a steam concentration of about 10% by volume. In general, precious metals aggregate at high temperatures above a specified level (about 500° C.). However, in the presence of steam, the temperature range in which precious metal aggregation takes place decreases, so that aggregation can progress more easily. It is considered that an alloy formed with Pt and Pd prevents aggregation of precious metals even in the presence of steam, thereby leading to improvement in durability.

Also, it is considered that in the ammonia decomposition catalyst of the present invention, the aforementioned alloy is loaded on an inorganic oxide, and thus is kept in a highly dispersed state, whereby high activity and durability can be obtained. Hereunder, this invention will be described in detail.

(Alloy Containing Pt and Pd)

The catalyst of the present invention comprises an alloy containing Pt and Pd as a component with ammonia decomposition activity. By using a catalyst containing Pt and Pd rather than a catalyst containing Pt alone or Pd alone, improvement is achieved in durability under an atmosphere with a relatively high steam concentration.

The mass ratio of Pt and Pd (Pt/Pd) is preferably in the range of from 0.1 to 10, more preferably from 0.5 to 7.0, still more preferably from 1.5 to 4.0. When the Pt/Pd ratio falls within the aforementioned range, catalyst durability under an atmosphere with a relatively high steam concentration is further improved, and the emission of $NO_x$ byproducts is prevented more sustainably.

The total content (loading) of Pt and Pd is preferably in the range of from 10 ppm by mass to 10000 ppm by mass, more preferably from 100 ppm by mass to 5000 ppm by mass, still more preferably from 500 ppm by mass to 3000 ppm by mass, based on the total mass of an inorganic oxide and a zeolite. When this loading is not less than 10 ppm by mass, adequate decomposition of ammonia is achieved. Also, when this loading is not more than 10000 ppm by mass, reduction of catalyst cost can be achieved. Therefore, the loading of Pt and Pd can be selected, as appropriate, within the aforementioned range depending on the characters of an exhaust gas to be treated, reaction conditions, and the time of use (durability).

The alloy comprises at least Pt and Pd, but may also contain an additional metal depending on the need. Examples of additional metals include, but are not limited to, Ir, Rh, Ru, Au, and Ag. The alloy may contain one type of such additional metals or may contain two or more types of them.

As referred to herein, the term "alloy containing Pt and Pd" refers to a metal composite in which an intermetallic compound is formed between Pt and Pd. The formation of an intermetallic compound between Pt and Pd can be confirmed by XAFS (x-ray absorption fine structure) analysis. When an intermetallic compound is formed between Pt and Pd, the XAFS analysis indicates the coordination of a Pd atom(s) around a Pt atom. More specifically, the XAFS analysis shows that the coordination number of a Pd atom(s) around a Pt atom is above zero. This coordination number is preferably not less than 0.8, more preferably not less than 3.0. When the alloy is formed with a coordination number failing within the aforementioned range, the effects of the present invention can be obtained more remarkably. The XAFS analysis can be carried out using, for example, an apparatus owned by Aichi Synchrotron Radiation Center, Aichi Science and Technology Foundation. The contents of Pt and Pd in a catalyst can be measured by ICP (inductively coupled plasma) analysis.

(Inorganic Oxide)

The catalyst of the present invention comprises an inorganic oxide as a support for an alloy containing Pt and Pd. With the use of the aforementioned alloy which is loaded on an inorganic oxide, improvement in catalyst durability is achieved.

In the present invention, the inorganic oxide is an inorganic oxide other than a zeolite as described later, and is exemplified by titania ($TiO_2$), zirconia ($ZrO_2$), silica ($SiO_2$), alumina ($Al_2O_3$), a ceria-zirconia composite oxide or solid solution ($CeO_2$—$ZrO_2$) (hereinafter also referred to as "ceria-zirconia"), and the like. As referred to above, the "ceria-zirconia" refers to a composite oxide or solid solution that comprises ceria and zirconia and may also contain a further substance other than ceria and zirconia. For example, the ceria-zirconia may also contain lanthanum. One type of the aforementioned inorganic oxides may be used alone, or two or more types of them may be used in combination.

Among the aforementioned inorganic oxides, ceria-zirconia is preferred from the viewpoints of higher initial ammonia decomposition activity and durability. Also, from the viewpoint of loading an alloy containing Pt and Pd on an inorganic oxide, an inorganic oxide having an affinity for salts serving as source materials for Pt and Pd is preferred. In other words, an inorganic oxide on which Pt and Pd can adsorb easily is preferred. Such inorganic oxides include, but are not limited to, alumina, titania, and ceria-zirconia.

The content of the inorganic oxide in the catalyst is preferably in the range of from 0.5 parts by mass to 50 parts by mass, more preferably from 1 parts by mass to 25 parts by mass, still more preferably from 5 parts by mass to 20 parts by mass, based on a total of 100 parts by mass of the inorganic oxide and a zeolite. When this content is not less than 0.5 parts by mass, the alloy is adequately loaded on the inorganic oxide. When this content is not more than 50 parts by mass, the content of a zeolite can be reserved, thereby leading to improvement in ammonia decomposition activity and preventing the emission of $NO_x$ byproducts.

The average particle size of the inorganic oxide is preferably in the range of from 0.1 μm to 100 μm, more preferably from 0.5 μm to 20 μm, from the viewpoint of ensuring that the alloy can fully perform its function. As referred to herein, the average particle size refers to a value measured by the laser diffraction/scattering particle size distribution analyzer LS-230 (product name; produced by Beckman Coulter, Inc.).

The specific surface area of the inorganic oxide is preferably in the range of from 5 $m^2/g$ to 600 $m^2/g$, more preferably from 25 $m^2/g$ to 300 $m^2/g$, still more preferably from 50 $m^2/g$ to 200 $m^2/g$. As referred to herein, the specific surface area refers to a value measured by the BET method.

In the catalyst of the present invention, the alloy is loaded at least on the inorganic oxide, but may also be loaded on a zeolite as described later. However, the alloy is preferably loaded mainly on the inorganic oxide, and may also be loaded exclusively on the inorganic oxide.

(Zeolite)

The catalyst of the present invention further comprises a zeolite aside from the inorganic oxide loaded with the alloy.

The type of the zeolite is not particularly limited, and the zeolite can be a natural product or a synthetic product. Examples of natural zeolite products include, but are not limited to, mordenite, erionite, ferrierite and chabazite. Examples of synthetic zeolite products include, but are not limited to, X-type zeolites, Y-type zeolites, MFI-type zeolites such as ZSM-5, L-type zeolites, A-type zeolites, β-type zeolites, and SAPO-34. Representative zeolite products include, but are not limited to, a HY-type zeolite available as LZY-84 (product name) from UOP, a silicalite available as MFI-40 (product name) from UOP, a β-type zeolite available as BETA-ZEOLITE (product name) from UOP, and a mordenite available as LZM-8 (product name) from UOP. One type of the aforementioned zeolite products may be used alone, or two or more types of them may be used in combination. Among these zeolite products, β-type zeolites are preferred from the viewpoints of high ammonia decomposition efficiency, low emissions of byproducts of NON, $N_2O$, CO, etc., and high efficiency of conversion to $N_2$.

The zeolite can be a protonated zeolite or a substituted zeolite. A mixture of a protonated zeolite and a substituted zeolite may be used as the zeolite. As referred to above, the "protonated zeolite" refers to a zeolite in which the ion-exchangeable cationic sites are at least partially occupied by $H^+$. In the present specification, for example, the protonated forms of mordenites are written as "H-mordenites", the protonated forms of ZSM-5 zeolites as exemplary MFI-type zeolites are written as "H-ZSM-5 zeolites", the protonated forms of Y-type zeolites are written as "HY-type zeolites", and the protonated forms of β-type zeolites are written as "H-β zeolites".

The "substituted zeolite" refers to a zeolite in which the ion-exchangeable cationic sites are at least partially occupied by other cations ("substituting cations") besides protons, such as $NH_4^+$ or metal cations. Hereinafter, those zeolites which are substituted with a metal cation selected as a substituting cation are written as "metal-substituted zeolites". In the present specification, for example, Y-type zeolites with cationic sites occupied by Fe cations are written as "Fe—Y-type zeolites", and Y-type zeolites with cationic sites occupied by $NH_4^+$ are written as "$NH_4$—Y-type zeolites". Other zeolites are also written in the same notation. Further, Fe cation-substituted zeolites are written as "Fe-zeolites", Cu cation-substituted zeolites are written as "Cu-zeolites", and Co cation-substituted zeolites are written as "Co-zeolites".

The type of a substituting metal that occupies the ion-exchangeable cationic sites of a metal-substituted zeolite is not particularly limited, and examples thereof include, but are not limited to, group 8 elements such as Fe, group 9 elements such as Co and Rh, group 10 elements such as Ni and Pd, and group 11 elements such as Cu and Ag. One type of the aforementioned substituting metals may be used alone, or two or more types of them may be used in combination. Among these substituting metals, Fe, Cu, Ni, Co and combinations thereof are preferred. In particular, Cu ion-exchanged zeolites, which are Cu-substituted zeolites, are preferred from the viewpoints of high ammonia decomposition efficiency, low emissions of byproducts of $NO_x$, $N_2O$, CO, etc., and high efficiency of conversion to $N_2$.

The combination between the type of zeolite and the type of substituting metal is not particularly limited, and any types of the aforementioned zeolites and substituting metals can be used in combination as appropriate. Exemplary combinations include, but are not limited to, Cu-substituted SAPO-34 zeolites ("Cu-SAPO-34 zeolites"), Fe-substituted β-type zeolites ("Fe-β zeolites"), and Cu-substituted β-type zeolites ("Cu-β zeolites"). Among them, Cu-β zeolites are preferred from the viewpoints of higher ammonia decomposition efficiency, lower emissions of byproducts of $NO_x$, $N_2O$, CO, etc., and higher efficiency of conversion to $N_2$.

The content of a substituting metal in a metal-substituted zeolite is selected, as appropriate, depending on the $SiO_2/Al_2O_3$ molar ratio of the zeolite. For example, the total content of the substituting metal can be in the range of from 1 to 6% by mass based on the mass of the metal-substituted zeolite. The content of a substituting metal in a metal-substituted zeolite can be determined by XRF (x-ray fluorescence) and can be measured using ZSX Primus II (product name; produced by Rigaku Corporation).

The average particle size of the zeolite can be not less than 1 μm, preferably in the range of from 2 μm to 50 μm, more preferably from 2 μm to 30 μm. The average particle size of the zeolite can be measured by the same procedure as for the average particle size of the inorganic oxide as described above.

The content of the zeolite in the catalyst is preferably in the range of from 50 parts by mass to 99.5 parts by mass, more preferably from 75 parts by mass to 99 parts by mass, still more preferably from 80 parts by mass to 95 parts by mass, based on a total of 100 parts by mass of the inorganic oxide and the zeolite. When this content is not less than 50 parts by mass, improvement in ammonia decomposition activity is achieved, and the emission of $NO_x$ byproducts is prevented. When this content is not more than 99.5 parts by mass, the content of the inorganic oxide can be reserved, so that the alloy is adequately loaded on the inorganic oxide.

(Binder)

For the purpose of molding the catalyst of the present invention or loading the catalyst on a supporting substrate, the catalyst can be used in admixture with a binder. As the binder, an inorganic binder can be used. Specific examples of inorganic binders include, but are not limited to, colloidal silica, silica sol, alumina sol, silicic acid sol, titania sol, boehmite, clay, kaolin, and sepiolite. One type of the aforementioned inorganic binders may be used alone, or two or more types of them may be used in combination.

(Supporting Substrate)

The catalyst of the present invention can be used as it is, but may also be used in a state loaded on a supporting substrate such as honeycomb support. The shape of the supporting substrate is not particularly limited, but the supporting substrate is preferably of a shape that generates only a small differential pressure during the flow of a gas and has a large area of contact with a gas. Specific shapes thereof include, but are not limited to, honeycomb, sphere, sheet, mesh, fiber, pipe, and filter. The type of the supporting substrate is also not particularly limited, and examples thereof include, but are not limited to, known catalyst supports such as cordierite and alumina, carbon fibers, metal fibers, glass fibers, ceramic fibers, and metals such as titanium, aluminum and stainless steel.

When the supporting substrate is a honeycomb support, the loading of Pt per liter of the honeycomb support is preferably in the range of from 10 mg to 200 mg, more preferably from 20 mg to 100 mg. The loading of Pd per liter of the honeycomb support is preferably in the range of from 3 mg to 200 mg, more preferably from 10 mg to 100 mg. The loading of the inorganic oxide per liter of the honeycomb support is preferably in the range of from 3 g to 50 g, more preferably from 5 g to 30 g. The loading of the zeolite per liter of the honeycomb support is preferably in the range of from 10 g to 200 g, more preferably from 30 g to 100 g.

(Catalyst Preparation Method)

The method for preparing the catalyst of the present invention is not particularly limited, and exemplary methods are (i) to (iii) as mentioned below.

(i) Impregnation of a particle mixture of an inorganic oxide and a zeolite with an aqueous solution containing a Pt salt and a Pd salt.

(ii) Addition of a Pt salt and a Pd salt to a slurry containing an inorganic oxide and a zeolite.

(iii) Mixing of a previously prepared inorganic oxide loaded with Pt and Pd, with other components including a zeolite.

Examples of Pt salts include, but are not limited to, dinitrodiammine platinum, chloroplatinic acid, and tetraammine platinum. Examples of Pd salts include, but are not limited to, palladium nitrate, palladium chloride, and tetraammine palladium. In the present invention, method (iii) is preferred from the viewpoint that catalysts obtained thereby are superior in ammonia decomposition activity and durability.

The catalyst of the present invention can be in the form of a powder or in the form of a slurry. In practical use, the catalyst can be used in the form of molded particles such as granules, or in a state loaded on a supporting substrate such as honeycomb support as mentioned above. The following describes specific examples of a method for preparing a catalyst loaded on a supporting substrate.

In one instance, as mentioned above regarding method (iii), inorganic oxide particles, a Pt compound and a Pd compound are first added to water to prepare inorganic oxide particles loaded with Pt and Pd, and then zeolite particles and optionally a binder are added to the Pt and Pd-loaded inorganic oxide particles to prepare a slurry. In another instance, as mentioned above regarding method (ii), inorganic oxide particles and zeolite particles, followed by a Pt salt, a Pd salt and optionally a binder, are added to water to prepare a slurry. The prepared slurry is coated to a supporting substrate, and dried. The coating method is not particularly limited, and any known methods, such as wash coating and dipping, can be used. The thickness of a catalyst layer can be adjusted, as appropriate, by repeating the aforementioned procedure depending on the need.

[Exhaust Gas Treatment Method]

The exhaust gas treatment method of the present invention comprises the step of bringing the ammonia decomposition catalyst described above into contact with an ammonia-containing exhaust gas to effect ammonia decomposition. According to the aforementioned method, the catalyst can decompose ammonia over a long period of time while maintaining high ammonia decomposition activity and low emissions of nitrogen oxides, even under an atmosphere with a relatively high steam concentration.

The type of an exhaust gas to be treated is not particularly limited as long as it contains ammonia. Examples of exhaust gases include, but are not limited to, ammonia-containing exhaust gases emitted from semiconductor and other factories, coke oven exhaust gas, ammonia slip-containing gases emitted from a fuel gas denitration process, and exhaust gases emitted from a stripping process of ammonia-containing wastewaters discharged from sewage plants, sludge disposal equipment or other facilities.

As an example, the following describes a method for treating an exhaust gas emitted from a sewage plant. First, a sludge obtained from a sewage plant is dehydrated in a dehydrator, and a produced wastewater is distilled in a distillator. If necessary, steam, or steam and nitrogen gas, is/are further blown in from the outside and introduced into a separator for promoting the evaporation of water and ammonia. Ammonia-containing steam separated by distillation is separated into water and ammonia in a separation tank, and exhaust heat is recovered. Water and ammonia-rich steam (ammonia-containing exhaust gas) is introduced into a catalytic reactor, and a required amount of air is separately introduced from the outside, to bring the steam into contact with a catalyst, thereby decomposing and detoxifying ammonia to nitrogen and steam. This process is summarized in, for example, Japanese Unexamined Patent Application Publication No. JP 2002-28637.

The method of the present invention is preferably applied particularly to the treatment of exhaust gases emitted from activated sludge processes. Such exhaust gases can comprise 20% by volume to 70% by volume of steam, 10 ppm by mass to 200 ppm by mass of a sulfur compound in terms of sulfur content, 100 ppm by volume to 3% by volume of ammonia, and nitrogen as the balance. Thus, the exhaust gases for which the method of this invention is particularly effective are gases substantially comprising steam and nitrogen as main components besides ammonia. Further, the method of this invention is preferably applied to the treatment of ammonia in exhaust gases containing a sulfur compound. Additionally, the aforementioned exhaust gases emitted from activated sludge processes are not the sole examples but are merely some examples of the exhaust gases that can be used in the method of this invention. Furthermore, the method of this invention is applicable to, for example, the treatment of common ammonia-containing exhaust gases containing air as a main component.

In the method of the present invention, the steam concentration in an exhaust gas to be treated is not particularly limited, but is preferably not more than 10% by volume because the method of this invention is particularly effective for exhaust gases with such a steam concentration. The ammonia concentration in an exhaust gas is not particularly limited, and can be, for example, in the range of from 10 ppm by volume to 5% by volume. It is desirable to adjust the ammonia concentration in an exhaust gas to be fed to a catalyst reactor to be preferably not more than 3% by volume, more preferably not more than 2% by volume. By adjusting the ammonia concentration in an exhaust gas to be not more than 3% by volume before the gas is fed to a catalyst reactor, heat generation from the catalytic reaction can be prevented more effectively, thereby fully reducing catalyst degradation caused by excessive increase in catalyst layer temperature.

In the method of the present invention, the catalyst of this invention is brought into contact with an ammonia-containing exhaust gas and air, so that ammonia can be oxidatively decomposed to convert to harmless nitrogen gas and water. The oxidative decomposition reaction of ammonia is represented by the following scheme (1).

$$4NH_3 + 3O_2 \rightarrow 6H_2O + 2N_2 \quad (1)$$

Therefore, in the case of treating an exhaust gas lacking sufficient oxygen required for oxidative decomposition reaction, air or an oxygen-containing gas can be injected from the outside at the inlet of a catalyst reactor. The oxygen content in the exhaust gas is preferably a value sufficient to meet the requirement that the ratio of said oxygen content to theoretical oxygen demand should be preferably not less than 1.03, more preferably not less than 1.1. As referred to above, the "theoretical oxygen demand" refers to the stoichiometric amount of oxygen required which is calculated based on the scheme (1) shown above. For example, when the ammonia concentration at the inlet of a catalyst reactor is 1.0% by volume, the required oxygen concentration is preferably not less than 0.77% by volume, more preferably not less than 0.838% by volume.

The temperature of the oxidative decomposition reaction is determined, as appropriate, depending on the characters (e.g., steam concentration, ammonia concentration) of an exhaust gas, reaction conditions (e.g., space velocity), the degree of catalyst degradation, and the like, but this temperature is preferably in the range of from 200 to 500° C., more preferably from 250 to 450° C. The space velocity (SV) of an exhaust gas to be treated relative to catalyst volume is determined, as appropriate, in consideration of the characters (e.g., steam concentration, ammonia concentration) of the exhaust gas, the target value of ammonia decomposition efficiency, and the like, but this SV value is preferably in the range of from 100 to 100000 hr$^{-1}$.

EXAMPLES

Hereunder, the present invention will be described in detail by way of examples. However, this invention is not limited to these examples.

Example 1

(Preparation of Catalyst)

First, 2.5 g of an aqueous solution of dinitrodiammine platinum (Pt concentration: 4.5% by mass) and 0.16 g of an aqueous solution of palladium nitrate (Pd concentration: 10.0% by mass) were added to 130 g of deionized water, and the contents were mixed. Then, 16.5 g of a ceria-zirconia-containing powder (product name: CZ-08; produced by Daiichi Kigenso Kagaku Kogyo Co., Ltd.; average particle size: 0.5-10 μm; specific surface area: 70 m$^2$/g) was added, and the contents were stirred for about 5 hours. Next, 202 g of the binder component SNOWTEX-C (product name; produced by Nissan Chemical Corporation) was added, and the contents were stirred thoroughly. Thereafter, 155.5 g of a Cu-β zeolite powder (product name: Cu-TZB223L; produced by Clariant Catalysts K.K.; average particle size: 1.3 μm; Cu content: 4.5% by mass) was added, and the contents were stirred thoroughly to form a slurry. The slurry was coated to a honeycomb cordierite support (cell count: 200 cells/sq.in.; 50 mm in length×50 mm in width×50 mm in height; volume: 0.125 L) by wash coating, dried at 150° C. for 2 hours, and calcined at 500° C. for 1 hour to prepare a honeycomb catalyst.

In the honeycomb catalyst prepared above, 105 g of a catalyst layer (inorganic oxide: 10 g, zeolite: 70 g; binder: 25 g) was loaded per liter of the honeycomb support. The masses of an inorganic oxide, a zeolite and a binder in the catalyst layer were calculated by multiplying the mass of the catalyst layer loaded on the honeycomb support by each of the percent solid contents of the different components in the prepared slurry. The Pt loading was 70 mg per liter of the honeycomb support, and the Pd loading was 10 mg per liter of the honeycomb support. The Pt and Pd loadings were 875 ppm by mass and 125 ppm by mass, respectively (1000 ppm by mass in total), based on the total mass of the inorganic oxide and the zeolite. The Pt and Pd loadings were calculated from the feed amounts of Pt and Pd source materials. It was observed by XAFS analysis that Pt and Pd formed an alloy (coordination number of Pd around Pt: 0.8). The compositional profile of the honeycomb catalyst prepared above is shown in Table 1.

(Initial Activity Evaluation)

A cylindrical honeycomb catalyst (21 mm in diameter, 50 mm in length) was taken from the above honeycomb catalyst, and loaded in a flow reactor. A specified gas was circulated while the flow was controlled by a mass flow controller. After the catalyst was heated to a specified temperature by heating the vicinity of the catalyst inlet using an electric furnace, the catalyst was evaluated for ammonia decomposition activity. The gas flow conditions, gas analysis procedures, and calculation methodologies adopted for this evaluation are as detailed below. The evaluation results are shown in Table 2.

[Gas Flow Conditions]

SV: 10,000 h$^{-1}$, NH$_3$: 1% by volume, H$_2$O: 10% by volume, O$_2$: 10% by volume, N$_2$: balance, 340° C.

[Gas Analysis Procedures]

NH$_3$: Gas chromatography (TCD detector)

NO$_x$: Chemiluminescence analyzer

N$_2$O: Gas chromatography (TCD detector)

[Calculation Methodologies]

NH$_3$ decomposition efficiency (%)=100−{(outlet NH$_3$ concentration)/(inlet NH$_3$ concentration)×100}

NO$_x$ emission (%)=(outlet NO$_x$ concentration)/(inlet NH$_3$ concentration)×100

N$_2$O emission (%)={(outlet N$_2$O concentration)×2/(inlet NH$_3$ concentration)}×100

(Durability Evaluation)

After the cylindrical honeycomb catalyst prepared above was loaded in a flow reactor and heated to a specified temperature, a gas was continuously circulated under the gas flow conditions detailed below. The catalyst was monitored for change over time in ammonia decomposition efficiency to confirm the time (T97) until the percentage of ammonia decomposition declined to 97%. The ammonia concentration analysis procedure and the methodology for calculating ammonia decomposition efficiency were the same as mentioned above. The evaluation results are shown in Table 2.

[Gas Flow Conditions]

SV: 10,000 h$^{-1}$, NH$_3$: 1% by volume, H$_2$O: 10% by volume, O$_2$: 10% by volume, N$_2$: balance, 340° C.

Example 2

A honeycomb catalyst was prepared by the same procedure as in Example 1 except that the amount added of an aqueous solution of palladium nitrate was changed to 0.32 g. The Pt loading was 70 mg per liter of the honeycomb support, and the Pd loading was 20 mg per liter of the honeycomb support. The Pt and Pd loadings were 875 ppm by mass and 250 ppm by mass, respectively (1125 ppm by mass in total), based on the total mass of the inorganic oxide and the zeolite. The compositional profile of the honeycomb catalyst prepared above is shown in Table 1.

Further, the honeycomb catalyst prepared above was evaluated for initial activity and durability by the same procedure as in Example 1. The evaluation results are shown in Table 2.

Example 3

A honeycomb catalyst was prepared by the same procedure as in Example 1 except that the amount added of an aqueous solution of palladium nitrate was changed to 0.48 g. The Pt loading was 70 mg per liter of the honeycomb support, and the Pd loading was 30 mg per liter of the honeycomb support. The Pt and Pd loadings were 875 ppm by mass and 375 ppm by mass, respectively (1250 ppm by mass in total), based on the total mass of the inorganic oxide and the zeolite. It was observed by XAFS analysis that Pt and Pd formed an alloy (coordination number of Pd around Pt: 5.5). The compositional profile of the honeycomb catalyst prepared above is shown in Table 1.

Further, the honeycomb catalyst prepared above was evaluated for initial activity and durability by the same procedure as in Example 1. The evaluation results are shown in Table 2.

Example 4

A honeycomb catalyst was prepared by the same procedure as in Example 1 except that the amount added of an aqueous solution of palladium nitrate was changed to 0.60 g. The Pt loading was 70 mg per liter of the honeycomb support, and the Pd loading was 40 mg per liter of the honeycomb support. The Pt and Pd loadings were 875 ppm by mass and 500 ppm by mass, respectively (1375 ppm by mass in total), based on the total mass of the inorganic oxide and the zeolite. The compositional profile of the honeycomb catalyst prepared above is shown in Table 1.

Further, the honeycomb catalyst prepared above was evaluated for initial activity and durability by the same procedure as in Example 1. The evaluation results are shown in Table 2.

Example 5

A honeycomb catalyst was prepared by the same procedure as in Example 1 except that the amount added of an aqueous solution of palladium nitrate was changed to 0.72 g. The Pt loading was 70 mg per liter of the honeycomb support, and the Pd loading was 50 mg per liter of the honeycomb support. The Pt and Pd loadings were 875 ppm by mass and 625 ppm by mass, respectively (1500 ppm by mass in total), based on the total mass of the inorganic oxide and the zeolite. The compositional profile of the honeycomb catalyst prepared above is shown in Table 1.

Further, the honeycomb catalyst prepared above was evaluated for initial activity and durability by the same procedure as in Example 1. The evaluation results are shown in Table 2.

Example 6

A honeycomb catalyst was prepared by the same procedure as in Example 1 except that the amount added of an aqueous solution of palladium nitrate was changed to 1.13 g. The Pt loading was 70 mg per liter of the honeycomb support, and the Pd loading was 70 mg per liter of the honeycomb support. The Pt and Pd loadings were 875 ppm by mass and 875 ppm by mass, respectively (1750 ppm by mass in total), based on the total mass of the inorganic oxide and the zeolite. The compositional profile of the honeycomb catalyst prepared above is shown in Table 1.

Further, the honeycomb catalyst prepared above was evaluated for initial activity and durability by the same procedure as in Example 1. The evaluation results are shown in Table 2.

Example 7

A honeycomb catalyst was prepared by the same procedure as in Example 1 except that the amount added of an aqueous solution of palladium nitrate was changed to 1.62 g. The Pt loading was 70 mg per liter of the honeycomb support, and the Pd loading was 100 mg per liter of the honeycomb support. The Pt and Pd loadings were 875 ppm by mass and 1250 ppm by mass, respectively (2125 ppm by mass in total), based on the total mass of the inorganic oxide and the zeolite. It was observed by XAFS analysis that Pt and Pd formed an alloy (coordination number of Pd around Pt: 4.2). The compositional profile of the honeycomb catalyst prepared above is shown in Table 1.

Further, the honeycomb catalyst prepared above was evaluated for initial activity and durability by the same procedure as in Example 1. The evaluation results are shown in Table 2.

Example 8

A honeycomb catalyst was prepared by the same procedure as in Example 1 except that the amounts added of an aqueous solution of dinitrodiammine platinum and an aqueous solution of palladium nitrate were changed to 1.08 g and 0.49 g, respectively. The Pt loading was 30 mg per liter of the honeycomb support, and the Pd loading was 30 mg per liter of the honeycomb support. The Pt and Pd loadings were 375 ppm by mass and 375 ppm by mass, respectively (750 ppm by mass in total), based on the total mass of the inorganic oxide and the zeolite. It was observed by XAFS analysis that Pt and Pd formed an alloy (coordination number of Pd around Pt: 3.5). The compositional profile of the honeycomb catalyst prepared above is shown in Table 1.

Further, the honeycomb catalyst prepared above was evaluated for initial activity and durability by the same procedure as in Example 1. The evaluation results are shown in Table 2.

Example 9

A honeycomb catalyst was prepared by the same procedure as in Example 3 except that CZ-08 used as an inorganic oxide was replaced with 16.5 g of a γ alumina powder (product name: CB Powder; produced by Nikki-Universal Co., Ltd.; average particle size: 10 μm; specific surface area: 147 m²/g). The Pt loading was 70 mg per liter of the honeycomb support, and the Pd loading was 30 mg per liter of the honeycomb support. The Pt and Pd loadings were 875 ppm by mass and 375 ppm by mass, respectively (1250 ppm by mass in total), based on the total mass of the inorganic oxide and the zeolite. It was observed by XAFS analysis that Pt and Pd formed an alloy (coordination number of Pd around Pt: 4.6). The compositional profile of the honeycomb catalyst prepared above is shown in Table 1.

Further, the honeycomb catalyst prepared above was evaluated for initial activity and durability by the same procedure as in Example 1. The evaluation results are shown in Table 2.

Example 10

A honeycomb catalyst was prepared by the same procedure as in Example 8 except that CZ-08 used as an inorganic oxide was replaced with 16.5 g of CB Powder. The Pt loading was 30 mg per liter of the honeycomb support, and the Pd loading was 30 mg per liter of the honeycomb support. The Pt and Pd loadings were 375 ppm by mass and 375 ppm by mass, respectively (750 ppm by mass in total), based on the total mass of the inorganic oxide and the zeolite. The compositional profile of the honeycomb catalyst prepared above is shown in Table 1.

Further, the honeycomb catalyst prepared above was evaluated for initial activity and durability by the same procedure as in Example 1. The evaluation results are shown in Table 2.

Example 11

A honeycomb catalyst was prepared by the same procedure as in Example 8 except that the Cu-β zeolite powder used as a zeolite was replaced with a Fe-β zeolite (product name: MB-2F; produced by Tosoh Corporation; average particle size: 3.6 μm; Fe content: 3.0% by mass) The Pt loading was 30 mg per liter of the honeycomb support, and the Pd loading was 30 mg per liter of the honeycomb support. The Pt and Pd loadings were 375 ppm by mass and 375 ppm by mass, respectively (750 ppm by mass in total), based on the total mass of the inorganic oxide and the zeolite. The compositional profile of the honeycomb catalyst prepared above is shown in Table 1.

Further, the honeycomb catalyst prepared above was evaluated for initial activity and durability by the same procedure as in Example 1. The evaluation results are shown in Table 2.

Comparative Example 1

First, 2.5 g of an aqueous solution of dinitrodiammine platinum (Pt concentration: 4.5% by mass) was added to 65 g of deionized water. Then, 8.3 g of a ceria-zirconia-containing powder (CZ-08) was added, and the contents were stirred for about 5 hours. The thus-obtained Pt-containing solution was designated as solution A. Separately, 0.48 g of an aqueous solution of palladium nitrate (Pd concentration: 10.0% by mass) was added to 65 g of deionized water. Then, 8.3 g of a ceria-zirconia-containing powder (CZ-08) was added, and the contents were stirred for about 5 hours. The thus-obtained Pd-containing solution was designated as solution B. After solution A and solution B were mixed together, 202 g of the binder component SNOWTEX-C was added, and the contents were stirred thoroughly. Thereafter, 155.5 g of a Cu-0 zeolite powder (Cu-TZB223L) was added, and the contents were stirred thoroughly to form a slurry. By following the same procedure as in Example 1 except for using the above slurry, a honeycomb catalyst was prepared in which 105 g of a catalyst layer was loaded per liter of a honeycomb support.

The Pt loading was 70 mg per liter of the honeycomb support, and the Pd loading was 30 mg per liter of the honeycomb support. The Pt and Pd loadings were 875 ppm by mass and 375 ppm by mass, respectively (1250 ppm by mass in total), based on the total mass of the inorganic oxide and the zeolite. Since in the honeycomb catalyst of this comparative example, Pt and Pd were each loaded on the separate ceria-zirconia, no alloy of Pt and Pd was observed in XAFS analysis (coordination number of Pd around Pt: 0). The compositional profile of the honeycomb catalyst prepared above is shown in Table 1.

Further, the honeycomb catalyst prepared above was evaluated for initial activity and durability by the same procedure as in Example 1. The evaluation results are shown in Table 2.

Comparative Example 2

A honeycomb catalyst was prepared by the same procedure as in Comparative Example 1 except that the amount added of an aqueous solution of dinitrodiammine platinum was changed to 1.08 g. The Pt loading was 30 mg per liter of the honeycomb support, and the Pd loading was 30 mg per liter of the honeycomb support. The Pt and Pd loadings were 375 ppm by mass and 375 ppm by mass, respectively (750 ppm by mass in total), based on the total mass of the inorganic oxide and the zeolite. Since in the honeycomb catalyst of this comparative example, Pt and Pd were each loaded on the separate ceria-zirconia, no alloy of Pt and Pd was observed in XAFS analysis (coordination number of Pd around Pt: 0). The compositional profile of the honeycomb catalyst prepared above is shown in Table 1.

Further, the honeycomb catalyst prepared above was evaluated for initial activity and durability by the same procedure as in Example 1. The evaluation results are shown in Table 2.

Comparative Example 3

First, 1.08 g of an aqueous solution of dinitrodiammine platinum (Pt concentration: 4.5% by mass) was added to 130 g of deionized water. Then, 16.5 g of a ceria-zirconia-containing powder (CZ-08) was added, and the contents were stirred for about 5 hours. Next, 202 g of the binder component SNOWTEX-C was added, and the contents were stirred thoroughly. Thereafter, 155.5 g of a Cu-0 zeolite powder (Cu-TZB223L) was added, and the contents were stirred thoroughly to form a slurry. By following the same procedure as in Example 1 except for using the above slurry, a honeycomb catalyst was prepared in which 105 g of a catalyst layer was loaded per liter of a honeycomb support. The Pt loading was 30 mg per liter of the honeycomb support. The Pt loading was 375 ppm by mass based on the total mass of the inorganic oxide and the zeolite. The compositional profile of the honeycomb catalyst prepared above is shown in Table 1.

Further, the honeycomb catalyst prepared above was evaluated for initial activity and durability by the same procedure as in Example 1. The evaluation results are shown in Table 2.

Comparative Example 4

A honeycomb catalyst was prepared by the same procedure as in Comparative Example 3 except that the amount added of an aqueous solution of dinitrodiammine platinum was changed to 2.5 g. The Pt loading was 70 mg per liter of the honeycomb support. The Pt loading was 875 ppm by mass based on the total mass of the inorganic oxide and the zeolite. The compositional profile of the honeycomb catalyst prepared above is shown in Table 1.

Further, the honeycomb catalyst prepared above was evaluated for initial activity and durability by the same procedure as in Example 1. The evaluation results are shown in Table 2.

Comparative Example 5

A honeycomb catalyst was prepared by the same procedure as in Comparative Example 3 except that 0.48 g of an aqueous solution of palladium nitrate (Pd concentration: 10.0% by mass) was added instead of an aqueous solution of dinitrodiammine platinum. The Pd loading was 30 mg per liter of the honeycomb support. The Pd loading was 375 ppm by mass based on the total mass of the inorganic oxide and the zeolite. The compositional profile of the honeycomb catalyst prepared above is shown in Table 1.

Further, the honeycomb catalyst prepared above was evaluated for initial activity and durability by the same procedure as in Example 1. The evaluation results are shown in Table 2.

As shown in Table 2, it is found that in the methods of Examples 1 to 11 which used the catalysts of the present invention, the catalysts exhibited high durability while maintaining high $NH_3$ decomposition efficiency and low emissions of $NO_x$ and $N_2O$, even under an atmosphere with a relatively high steam concentration.

TABLE 1

| Ex./Com. Ex. | Catalyst structure | Inorganic oxide Type | loading (g/L) | Pt loading (mg/L) | Pd loading (mg/L) | Pt and Pd loading based on the total mass of inorganic oxide and zeolite (ppm by mass) | Pt/Pd mass ratio | State of Pt/Pd | Zeolite Type | loading (g/L) |
|---|---|---|---|---|---|---|---|---|---|---|
| Ex. 1 | Pt-Pd/CZ + Cuβ | Ceria-zirconia | 10 | 70 | 10 | 1000 | 7.0 | Alloy | Cuβ | 70 |
| Ex. 2 | Pt-Pd/CZ + Cuβ | Ceria-zirconia | 10 | 70 | 20 | 1125 | 3.5 | Alloy | Cuβ | 70 |
| Ex. 3 | Pt-Pd/CZ + Cuβ | Ceria-zirconia | 10 | 70 | 30 | 1250 | 2.3 | Alloy | Cuβ | 70 |
| Ex. 4 | Pt-Pd/CZ + Cuβ | Ceria-zirconia | 10 | 70 | 40 | 1375 | 1.8 | Alloy | Cuβ | 70 |
| Ex. 5 | Pt-Pd/CZ + Cuβ | Ceria-zirconia | 10 | 70 | 50 | 1500 | 1.4 | Alloy | Cuβ | 70 |
| Ex. 6 | Pt-Pd/CZ + Cuβ | Ceria-zirconia | 10 | 70 | 70 | 1750 | 1.0 | Alloy | Cuβ | 70 |
| Ex. 7 | Pt-Pd/CZ + Cuβ | Ceria-zirconia | 10 | 70 | 100 | 2125 | 0.7 | Alloy | Cuβ | 70 |
| Ex. 8 | Pt-Pd/CZ + Cuβ | Ceria-zirconia | 10 | 30 | 30 | 750 | 1.0 | Alloy | Cuβ | 70 |
| Ex. 9 | Pt-Pd/Al₂O₃ + Cuβ | γ alumina | 10 | 70 | 30 | 1250 | 2.3 | Alloy | Cuβ | 70 |
| Ex. 10 | Pt-Pd/Al₂O₃ + Cuβ | γ alumina | 10 | 30 | 30 | 750 | 1.0 | Alloy | Cuβ | 70 |
| Ex. 11 | Pt-Pd/CZ + Feβ | Ceria-zirconia | 10 | 30 | 30 | 750 | 1.0 | Alloy | Feβ | 70 |
| Com. Ex. 1 | Pt/CZ + Pd/CZ + Cuβ | Ceria-zirconia | 10 | 70 | 30 | 1250 | 2.3 | Separate | Cuβ | 70 |
| Com. Ex. 2 | Pt/CZ + Pd/CZ + Cuβ | Ceria-zirconia | 10 | 30 | 30 | 750 | 1.0 | Separate | Cuβ | 70 |
| Com. Ex. 3 | Pt/CZ + Cuβ | Ceria-zirconia | 10 | 30 | — | 375 | — | Pt alone | Cuβ | 70 |
| Com. Ex. 4 | Pt/CZ + Cuβ | Ceria-zirconia | 10 | 70 | — | 875 | — | Pt alone | Cuβ | 70 |
| Com. Ex. 5 | Pd/CZ + Cuβ | Ceria-zirconia | 10 | — | 30 | 375 | — | Pd alone | Cuβ | 70 |

TABLE 2

| Ex./Com. Ex. | Catalyst structure | Initial activity evaluation $NH_3$ decomposition efficiency (%) | $NO_x$ emission (%) | $N_2O$ emission (%) | Durability evaluation (T97) (hr) |
|---|---|---|---|---|---|
| Ex. 1 | Pt-Pd/CZ + Cuβ | >99.99 | 0.05 | 4.1 | 3,150 |
| Ex. 2 | Pt-Pd/CZ + Cuβ | >99.99 | 0.05 | 4.1 | 12,000 |
| Ex. 3 | Pt-Pd/CZ + Cuβ | >99.99 | 0.10 | 4.4 | 21,000 |
| Ex. 4 | Pt-Pd/CZ + Cuβ | >99.99 | 0.10 | 4.4 | 11,400 |
| Ex. 5 | Pt-Pd/CZ + Cuβ | >99.99 | 0.18 | 5.1 | 3,900 |
| Ex. 6 | Pt-Pd/CZ + Cuβ | >99.99 | 0.45 | 5.7 | 6,600 |
| Ex. 7 | Pt-Pd/CZ + Cuβ | >99.99 | 0.67 | 6.5 | 6,300 |
| Ex. 8 | Pt-Pd/CZ + Cuβ | >99.99 | 0.03 | 3.8 | 8,100 |
| Ex. 9 | Pt-Pd/Al₂O₃ + Cuβ | >99.99 | 0.11 | 4.9 | 15,300 |
| Ex. 10 | Pt-Pd/Al₂O₃ + Cuβ | >99.99 | 0.07 | 4.2 | 6,600 |
| Ex. 11 | Pt-Pd/CZ + Feβ | >99.99 | 0.66 | 5.7 | 7,500 |
| Com. Ex. 1 | Pt/CZ + Pd/CZ + Cuβ | >99.99 | 0.40 | 6.5 | 2,760 |
| Com. Ex. 2 | Pt/CZ + Pd/CZ + Cuβ | >99.99 | 0.04 | 3.8 | 1,860 |
| Com. Ex. 3 | Pt/CZ + Cuβ | >99.99 | 0.03 | 2.4 | 1,440 |
| Com. Ex. 4 | Pt/CZ + Cuβ | >99.99 | 0.40 | 4.2 | 2,370 |
| Com. Ex. 5 | Pd/CZ + Cuβ | 92.3 | 0.01 | 1.7 | 0 |

The invention claimed is:

1. An ammonia decomposition catalyst capable of decomposing ammonia contained in an exhaust gas, the ammonia decomposition catalyst comprising:

an inorganic oxide loaded with an alloy containing Pt and Pd, and a zeolite, wherein the alloy containing Pt and Pd is a metal composite in which an intermetallic compound is formed between Pt and Pd and a coordination number of Pd atoms around a Pt atom, defined by XAFS analysis, is not less than 0.8.

2. The ammonia decomposition catalyst according to claim 1, wherein the inorganic oxide is at least one selected from titania, zirconia, silica, alumina, and a ceria-zirconia composite oxide or solid solution.

3. The ammonia decomposition catalyst according to claim 1, wherein the zeolite is a β-type zeolite.

4. The ammonia decomposition catalyst according to claim 1, wherein the zeolite is a copper ion-exchanged zeolite.

5. The ammonia decomposition catalyst according to claim 1, wherein the mass ratio of Pt and Pd (Pt/Pd) is in the range of from 0.1 to 10.

6. A method for treating an exhaust gas, the method comprising the step of bringing the ammonia decomposition catalyst according to claim 1 into contact with an ammonia-containing exhaust gas to effect ammonia decomposition.

\* \* \* \* \*